No. 796,272. PATENTED AUG. 1, 1905.
W. H. WILDER.
OIL STOVE.
APPLICATION FILED JAN. 30, 1903.
6 SHEETS—SHEET 2.
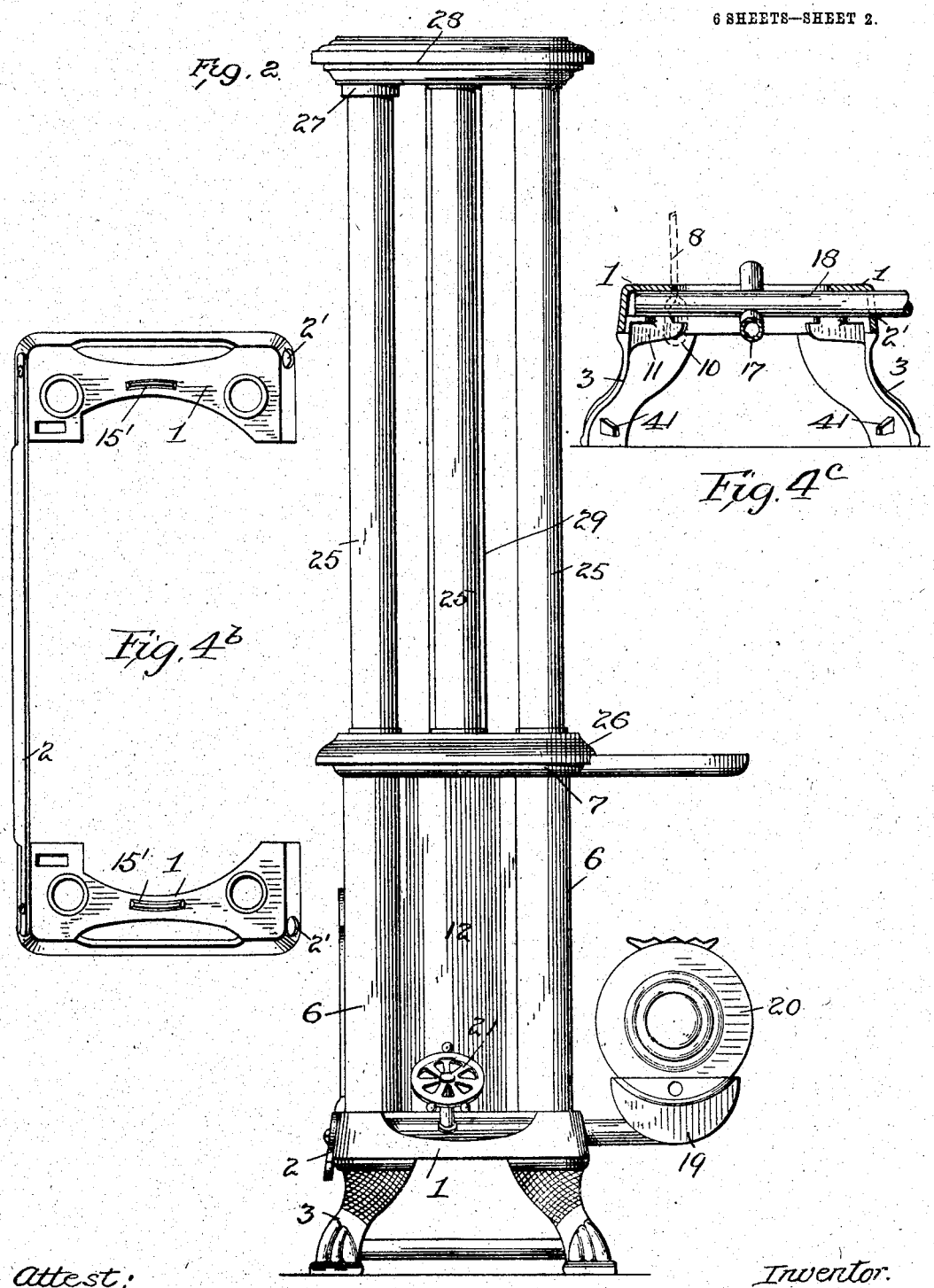
Inventor.
WILLIAM H. WILDER No. 796,272. PATENTED AUG. 1, 1905.
W. H. WILDER.
OIL STOVE.
APPLICATION FILED JAN. 30, 1903.
6 SHEETS—SHEET 3.
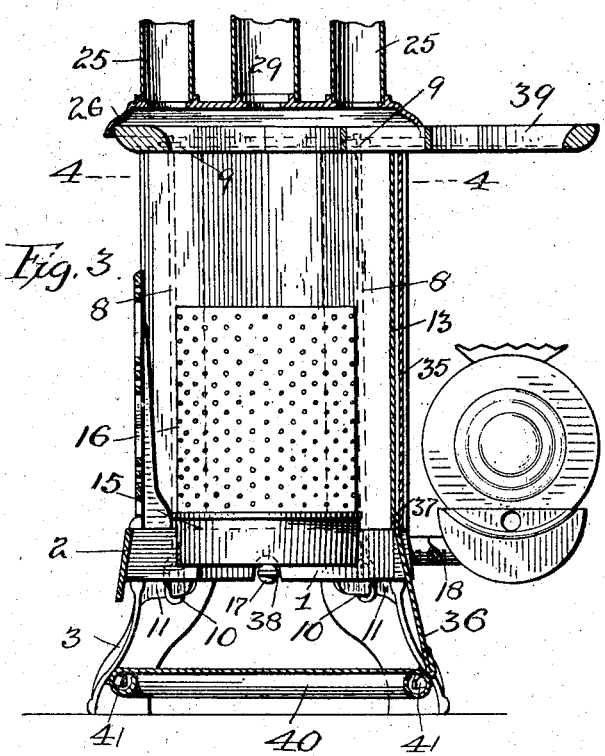
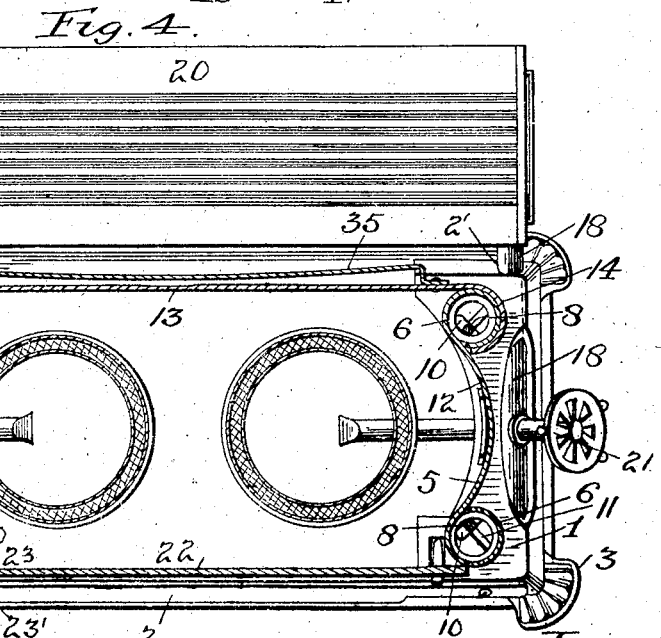
Attest
C. Middleton
Edward Sartor
Inventor
WILLIAM H. WILDER
by Ellis Spear & Company
Attys

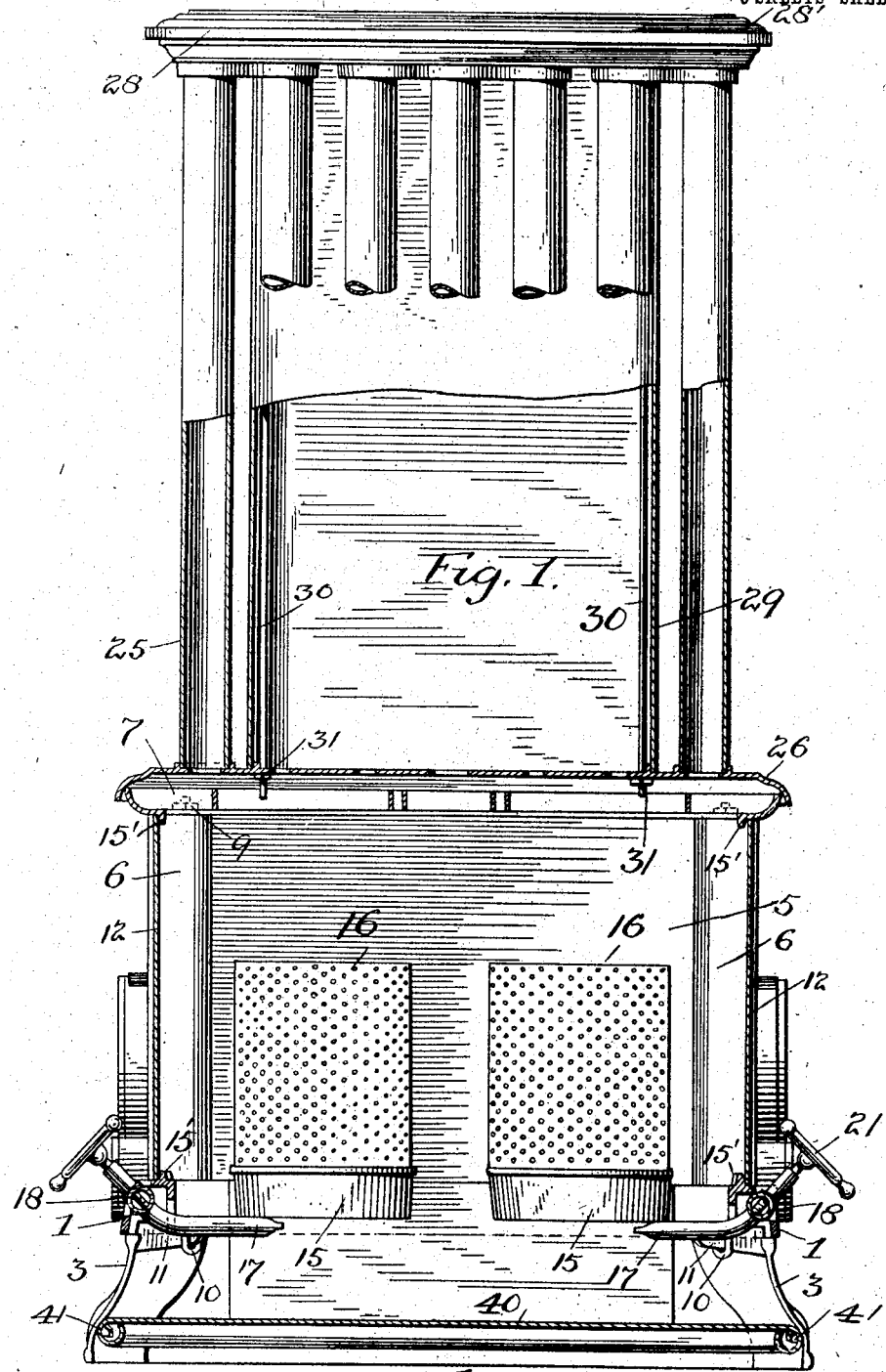

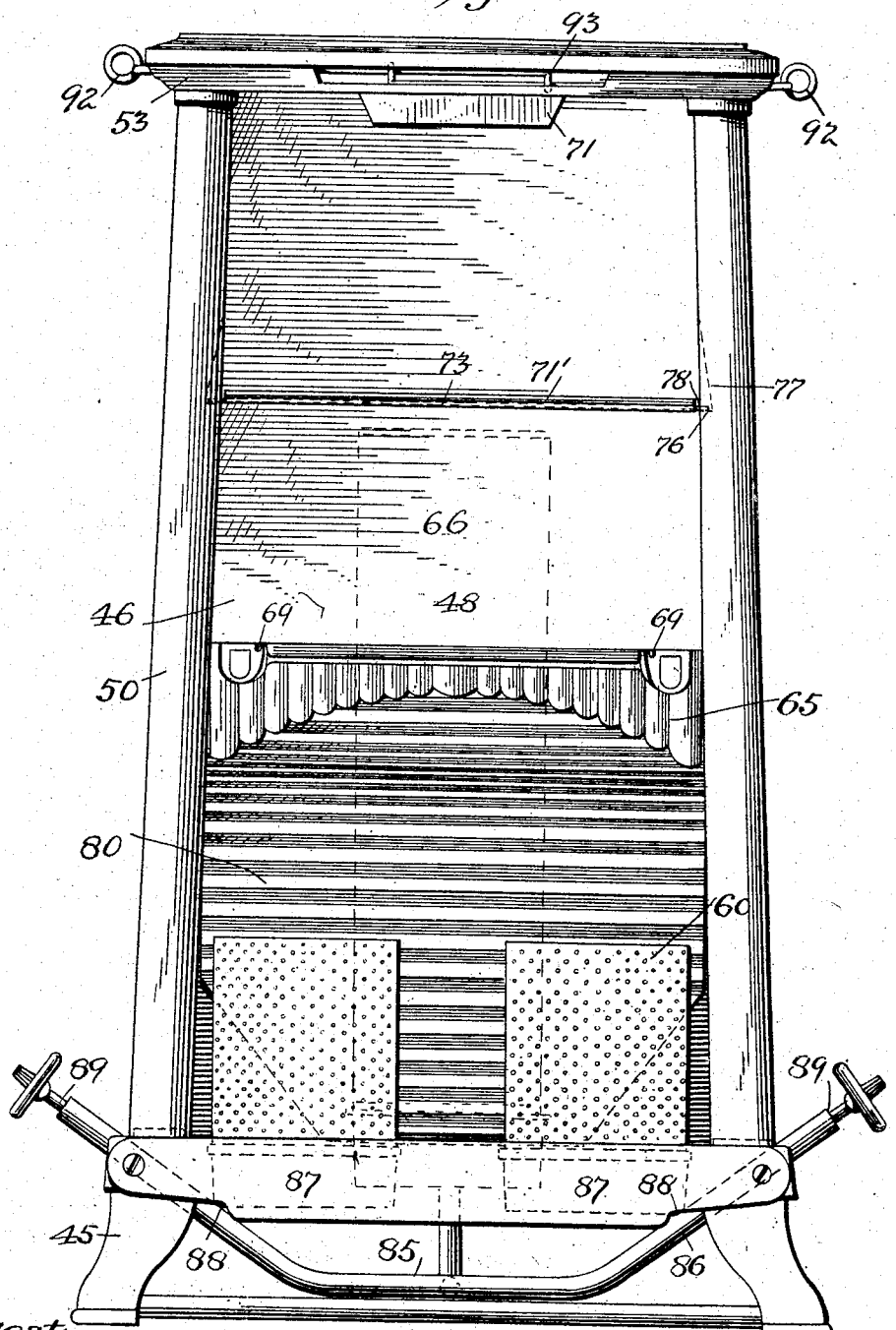

No. 796,272. PATENTED AUG. 1, 1905.
W. H. WILDER.
OIL STOVE.
APPLICATION FILED JAN. 30, 1903.
6 SHEETS—SHEET 5.
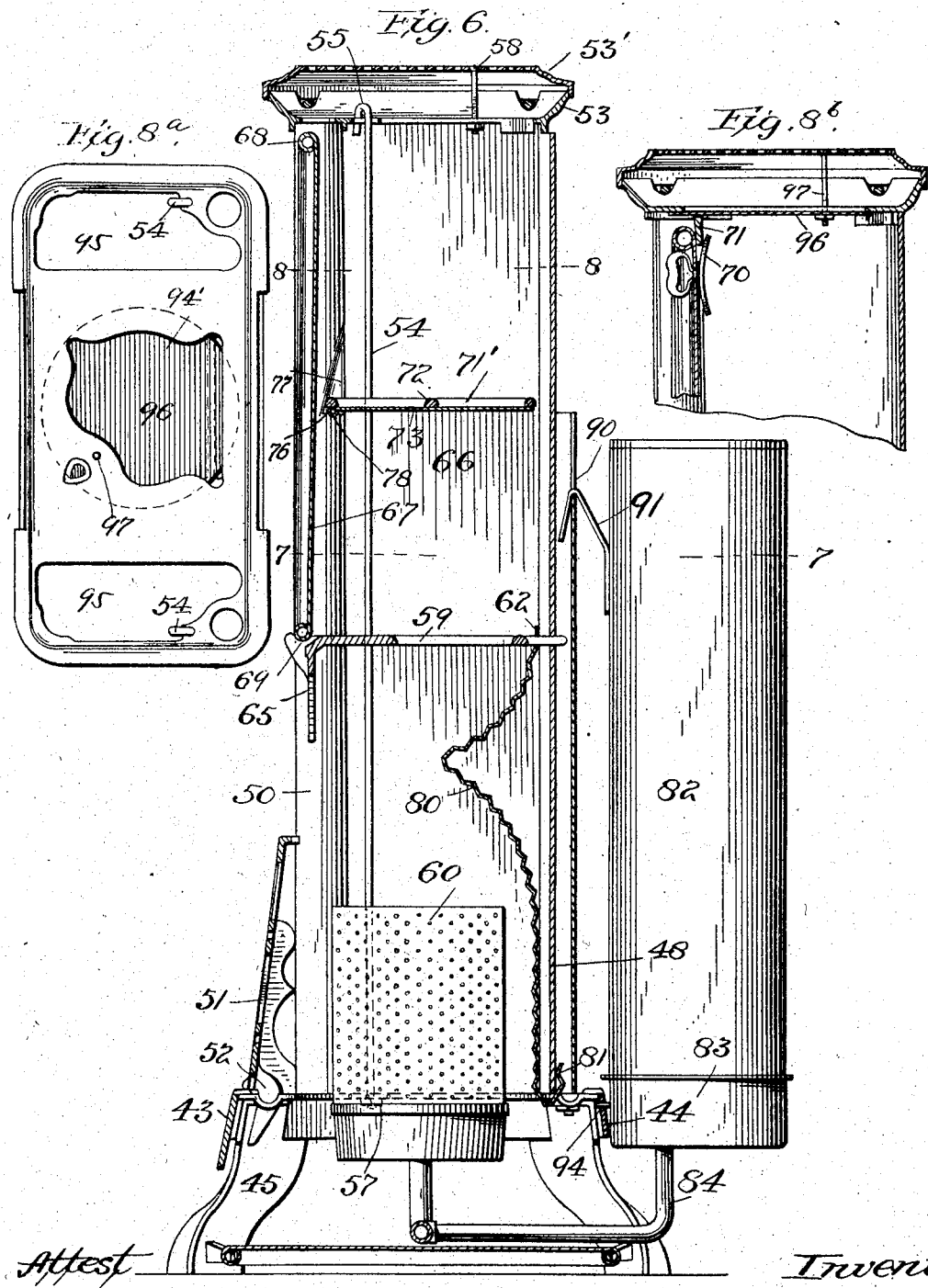
Attest
C. Middleton
Edward Sartow
Inventor
WILLIAM H. WILDER
by Ellis Spear & Company
Attys

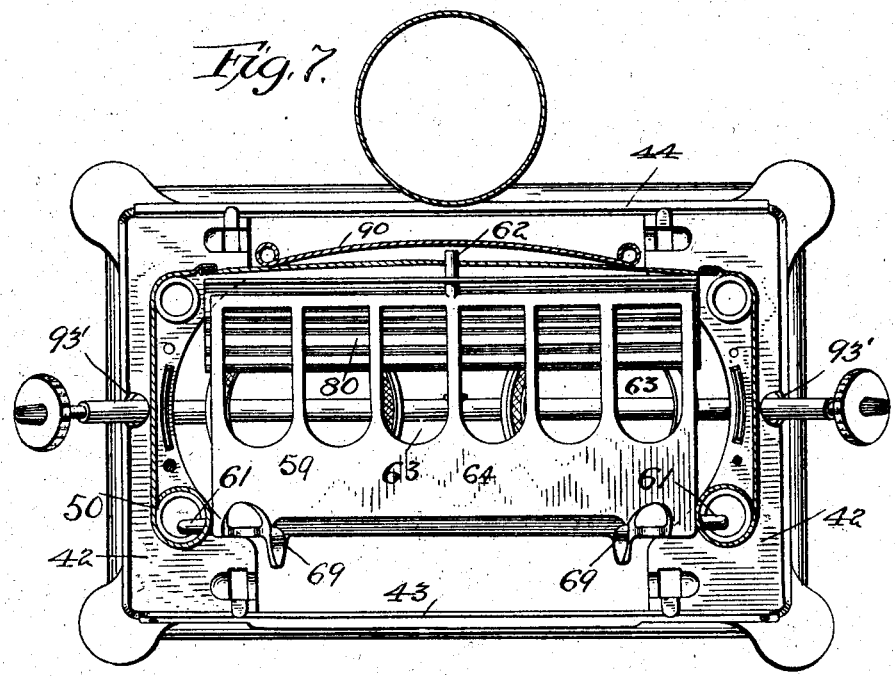

UNITED STATES PATENT OFFICE.

WILLIAM H. WILDER, OF GARDNER, MASSACHUSETTS.

OIL-STOVE.

No. 796,272.     Specification of Letters Patent.     Patented Aug. 1, 1905.

Application filed January 30, 1903. Serial No. 141,165.

*To all whom it may concern:*

Be it known that I, WILLIAM H. WILDER, a citizen of the United States, residing at Gardner, Massachusetts, have invented certain new and useful Improvements in Oil-Stoves, of which the following is a specification.

My invention relates to oil-stoves, and particularly to a heating-stove; and it comprises an oil-bowl, means for maintaining a column of oil therein, means of controlling the supply of oil thereto, a combustion-tube situated above the oil-bowl, and a heat-distributing section arranged above the combustion-tube, which distributing-section may be in the form of a radiator or of another form including therein an oven or heating compartment.

My invention consists in the features, combination, and arrangement of parts hereinafter described, and particularly pointed out in the claims.

In the accompanying drawings, Figure 1 is a part front elevation and sectional view of one embodiment of my invention. Fig. 2 is a side view of the form of the invention shown in Fig. 1. Fig. 3 is a detail sectional view of the lower part of the stove shown in Fig. 1. Fig. 4 is a sectional plan view on line 4 4 of Fig. 3. Figs. $4^a$, $4^b$, and $4^c$ are views of details. Fig. 5 is a front view of another embodiment of my invention with parts omitted. Fig. 6 is a vertical sectional view from front to rear of Fig. 5 with parts in elevation. Fig. 7 is a sectional plan view on line 7 7 of Fig. 6. Fig. 8 is a sectional plan view on line 8 8 of Fig. 6. Figs. $8^a$ and $8^b$ are views of details.

Referring to Figs. 1 to $4^c$, the base of the stove is made up of two end castings 1, connected at the front by a cross piece or plate 2. These end castings are supported upon feet 3, one at each corner of the stove, and they support the casing 5, of sheet metal, which is bent into cylindrical form to provide hollow columns 6 at the corners of the stove, which columns extend vertically and support a grate 7. This grate is held in place by tie-rods 8, extending down through the columns, said rods having threaded upper ends held by nuts 9 and having their lower ends provided with hooks 10, engaging the inwardly-extending projections 11 of the supporting-legs. These tie-rods draw the parts together to form a strong structure. The ends 12 of the casing are formed by the curved portion of the metal extending between the front and rear columns, while the rear part of the casing is formed by a plate 13, extending between the rear columns and having its ends bent around the same, as at 14, Fig. 4. The end castings 1, as well as the grate 7, are provided with projecting lips 15', against which the sheet-metal plate or plates forming the casing bear. Within this casing the burners 15 are arranged, these being similar in form to those shown in my prior patents and comprising a bowl in which a column of oil is maintained, the said bowl being surmounted by a combustion-tube 16. The bowl is supported on the end of a stub-pipe 17, extending inwardly from a supply-pipe 18. This supply-pipe extends through the rear depending wall of the end casting and is held at its front end partly by the said casting. It connects at its rear end with the oil-chamber 19, in which the reservoir 20 is supported. This reservoir is provided with a valve regulating the flow of oil into the chamber 19, whereby the oil in the said chamber and in the burner-bowl is maintained at a predetermined level. This valve forms no part of my invention, it being of well-known form and is therefore not illustrated herein. As shown in Fig. 1, I employ two burners, and the supply-pipes thereto extend from the ends of the oil-chamber 19. Valves 21 are provided to regulate the flow of oil through the oil-pipe. The front of the base portion of the stove is left open, excepting that it is provided with a grate 22, of any suitable open-work design, the said grating having pintles 23 to enter openings 23' in the end castings. These pintles allow the grating to be turned down to secure access to the burners, in which position the grate is maintained by lugs 24 thereon, engaging the front plate 2 before mentioned. Surmounting the base portion of the stove and resting upon the grate thereof I provide a heat-distributing section composed in the present embodiment of my invention of a number of tubes 25, extending vertically from a base-plate 26, having their upper ends extending into bosses 27 of a head or cap 28. The tubes are arranged in a series around the margin of the base and head plates, and within this series of tubes a drum 29 is located extending from the base-plate 26 to the head-plate 28. Tie-rods 30 have their screw-threaded lower ends held by nuts 31 to the base-plate, while their upper ends are hooked and engage bridge-pieces 32, extending across opening 33 of the lower section of the head-plate. By this construction the tubes and the drum are clamped between the base and head plates. The upper section 28' of the head is secured to the lower section by a screw 28″. From an inspection of Figs. 1 and 3 it will be noticed that the stove as a whole presents the appearance of an open grate surmounted by a radiator-section. The heat from the combustion-tubes passes up through the radiator-tubes and the radiator-drum, and a large surface is presented for the contact of the air and the radiation of the heat. The upper section of the head or cap plate is formed of open-work for the escape of the heated air. At the back of the lower casing I provide a shield 35, of sheet metal, secured at its edges to the back plate of the casing and having its middle portion arranged at a slight distance from the back of the casing, so as to provide an air-space, and thus form a shield between the burner and the reservoir. In order to close the rear part of the lower portion of the stove, I provide a plate 36, having its end or upper edge at 37 held between the shield 35 and the back wall of the casing. The oil-supply pipes are held in place by the stub-pipes passing through notches or openings 38 in the depending flanges of the end castings. The grate forming a part of the lower section of the stove is extended to the rear at 39, as shown in Fig. 3. The upper distributer or radiator-section may be removed from the lower section, which latter may then be used for cooking, if desired. The radiator-section has its base 26 adapted to fit loosely onto the upturned edge of the grate of the lower section. I provide a tray or bottom plate 40, held at a slight distance above the floor by projections 41, extending inwardly from the supporting-legs.

Referring to the modification of my invention shown in Figs. 5 to 8, it will be seen that the base is made up of end castings or plates 42, connected at their front by a cross-plate 43, screwed thereto, and by a rear plate or bar 44. This base is supported by legs 45, and the casing 46 extends upwardly therefrom, consisting of sheet-metal sections 47, forming the end walls of the casing and a section or back plate 48, these being jointed together at 49. The end walls are turned into the form of columns 50 at the front of the stove, and this front is left open adjacent to the burners to provide the open-grate effect. As in the form first described, a plate 51 is pivotally supported at 52 to the base of the stove, this plate being formed of open-work, presenting an ornamental appearance. It extends part way up the front of the stove to a point slightly above the plane of the top of the combustion-tubes of the burners. The casing is surmounted by a cap-piece or head 53, formed in two sections, the lower one of which is held in place on the top edge of the casing by tie-rods 54, having their hooked ends 55 engaging openings in the lower section of the cap-piece, the said tie-rods extending down through the end castings of the base and being held by nuts 57, engaging their threaded lower ends. The upper section 53′ of the head or cap is secured to the lower section 53 by screw 58, and said upper section is perforated or formed of open-work for the escape of the heated air. The heat-distributer in this form of my invention comprises the upper portion or extension of the casing with parts associated therewith. At 59 I show a shelf or grate arranged at a distance above the upper end of the combustion-tubes 60 of the burners, the said shelf being held in place by projections 61 thereon, entering openings in the columns 50. At its rear end this shelf is provided with a projection 62, which passes through the rear wall of the casing to sustain the shelf at this point. The shelf is of open-work at its rear edge, as shown at 63, while its front portion is intact to form a plate, as at 64, the said plate having a downwardly-projecting ornamental flange at 65, the lower edge of which is of arched form. The openings 63 form passages for the heat rising from the burners, while the flange 65 serves in a measure to direct the proper amount of heat to the said openings 63. This plate 64 forms a bottom of an oven 66, which is included within the heat-distributer, the front of the said oven being closed by a plate 67, formed of sheet metal with rolled edges 68. The lower rounded edge of this plate rests in sockets 69, in which the plate may have pivotal movement, and at its upper edge the plate is provided with a catch 70, adapted to engage a depending flange 71 on the lower section of the cap or head. Within the oven a shelf 71′ is arranged consisting of an open-work cast frame 72, having a sheet-metal plate 73 attached thereto by means of the ends 74 of said plate extending up and over the end bars of the cast frame. This shelf has arms 75 extending through openings in the casing near the rear thereof, and at its front edge it is supported by edges 76 on the columns 50, which are left by slitting the columns at this point and forcing a portion 77 thereof inwardly. In order to provide projections to rest on these slitted edges 76, the forward edge of the plate 73 is turned downwardly around a wire or rod 78, which projects sufficiently to bear upon the edges 76. As shown in Fig. 6, the shelf 71′ does not completely close the vertical space within the casing and passages are left around the edges of this shelf for the rise of the heat which may escape through the cap or head piece. For increasing the heating effect and to present an ornamental appearance I provide a corrugated back plate 80, the lower edge of which is held in place by being turned up at 81 around the lower edge of the back plate 48. At its upper edge the corrugated plate is held by the projection 62 of the shelf 59, which passes through an opening therein.

The reservoir in the present form of my invention is set with its axis vertically, as shown at 82, the lower end of the said reservoir resting in the oil-chamber 83, from which a supply-pipe 84 extends to connect with a pipe 85, extending from side to side of the stove and having oblique branches 86 extending upwardly, upon which the burner-bowls 87 are supported, being connected to the pipes at one side, as at 88. Valves 89 are provided, the spindles of which extend down through the oblique portions of the oil-pipe.

At the back of the stove I provide a shield 90, arranged at a slight distance from the back plate 48, so as to leave an air-channel and protect the reservoir from the heat from the back plate of the stove. This shield is suitably riveted to the back plate of the casing. The reservoir at its upper end is held by a hook 91, engaging the upper end of the shield-plate.

In order to carry the stove about, handles 92 are provided, which may be formed of wire and may be arranged to telescope, as shown at 93, where eyes are formed on the wire of one handle engaging loosely the wire of the other handle.

It will be seen that in both forms of the invention the casing extends only partly about the burners, presenting an open-grate effect for the lower part of the stove, while above the burners the stove is provided with a heat-distributing portion, which may in the one case comprise the radiator-section or heat-distributing pipes, and in the other case the heat-distributer may comprise the upper extension of the casing, including the heating chamber or oven. In both modifications the casing is made of sheet metal with hollow columns formed therein at the corners, the said columns being arranged over openings in the base or end castings.

In the form of the invention last described the oil-supply pipe is supported by its parts passing through openings 93' in the base of the stove. A pin 94 on the oil-chamber 83 also serves to support the oil-supplying parts, for which purpose it engages the rear bar of the frame or base. In the first form of my invention the oil-supply pipes extend through the openings 2' in the base and at their front ends they rest upon the upper side of the legs, as shown in Fig. $4^c$.

As shown in Fig. 8, the arms 75 form pintles allowing the shelf 71' to be tilted up to leave the interior of the upper part of the stove free for receiving articles to be warmed. The lower section of the cap or head piece in this form of the invention is formed of a casting having openings 94' 95, Fig. $8^a$, and in order to properly distribute the heat I provide a deflector-plate 96 of thin material, which closes up the central opening, said plate being held by a screw 97 and by its front edge engaging a part of the casting.

What I claim is—

1. In combination in an oil-stove, a burner, combustion-tubes surmounting the same, a casing having an open front exposing the combustion-tubes which are adapted to become red-hot in use, and a radiating or distributing section above the burner, substantially as described.

2. In combination with a blue-flame burner, comprising an oil-bowl, an oil-supply and exposed combustion-tubes, a casing for the burner having an open front, a distributing-section above the burner, and an oven or heating-compartment included within the section, substantially as described.

In testimony whereof I affix my signature in presence of two witnesses.

WILLIAM H. WILDER.

Witnesses:
C. H. STOCKWELL,
H. M. GATES.